(12) United States Patent
Miyashita et al.

(10) Patent No.: US 6,922,384 B2
(45) Date of Patent: Jul. 26, 2005

(54) INFORMATION REPRODUCING APPARATUS

(75) Inventors: Harumitsu Miyashita, Mino (JP);
Junichi Minamino, Nara (JP);
Hiromichi Ishibashi, Ibaraki (JP);
Shigeru Furumiya, Himeji (JP);
Masahito Nakao, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 457 days.

(21) Appl. No.: 09/996,843

(22) Filed: Nov. 29, 2001

(65) Prior Publication Data

US 2002/0064108 A1 May 30, 2002

(30) Foreign Application Priority Data

Nov. 30, 2000 (JP) ........................................ 2000-364196

(51) Int. Cl.[7] ................................................ G11B 7/00
(52) U.S. Cl. ................................ 369/59.22; 369/47.35; 369/47.26; 369/59.19; 369/59.21
(58) Field of Search .......................... 369/47.26, 47.35, 369/59.11, 59.2, 59.22, 59.19, 59.21, 59.18

(56) References Cited

U.S. PATENT DOCUMENTS 5,596,559 A * 1/1997 Hiramatsu ............... 369/59.19
6,278,675 B1 * 8/2001 Kuribayashi et al. ..... 369/59.17

FOREIGN PATENT DOCUMENTS

| JP | 10-228733 A | | 8/1998 | |
| JP | 10228733 A | * | 8/1998 | ........... G11B/20/14 |
| JP | 11-120702 A | | 4/1999 | |
| JP | 11-259985 A | | 9/1999 | |
| WO | WO 01/33568 A1 | | 5/2001 | |

OTHER PUBLICATIONS

Osawa et al., "Signal Processing Technologies For High Density Magnetic Recording", *Shingakuron*, vol. J81–C–I, No. 4, pp. 195–214, (1998).

* cited by examiner

*Primary Examiner*—David L. Ometz
*Assistant Examiner*—J. Ortiz-Criado
(74) *Attorney, Agent, or Firm*—Akin Gump Strauss Hauer & Feld, LLP

(57) ABSTRACT

An apparatus for reproducing information that has been digitally recorded on a storage medium includes first and second waveform equalizers. The first waveform equalizer equalizes a read signal, corresponding to the information read out from the storage medium, thereby outputting a first equalized signal. The second waveform equalizer has an equalization characteristic different from that of the first waveform equalizer, outputs a second equalized signal and is selectively used to extract a read clock signal.

9 Claims, 11 Drawing Sheets

PRIOR ART

INFORMATION REPRODUCING APPARATUS

BACKGROUND OF THE INVENTION

1. Field of the Invention

The present invention relates to an apparatus for reproducing information that has been written on a storage medium such as an optical disk or a magnetic disk.

2. Description of the Related Art

Recently, various types of digital information storage devices (e.g., hard disk drive (HDD), optical disk drive and magneto-optical disk drive) have been used extensively in audiovisual appliances, personal computers and video tape recorders (VTRs) with a built-in digital recording camera, for example. These storage devices are now required to further increase the storage capacity. To increase the storage capacity, data should be recorded at a sufficiently high density on a storage medium such as hard disk, optical disk or magneto-optical disk, and the data recorded should be read accurately enough.

Among various high-density signal recording/processing techniques, a partial response maximum likelihood (PRML) method is known as a technique that has been highly developed particularly in the field of HDDs. See Osawa, Okamoto and Saito, "Signal Processing Technology for High-Density Digital Magnetic Recording", Shingakuron C-II, Vol. J81-C-II, No. 4, pp. 393–412 (April 1998), for example. In the PRML method, data is written or read onto/from a storage medium while taking intersymbol interference, which occurs if the data has been recorded thereon at a high density, into account. More specifically, in reproducing information, digital data, or a version of the signal that has been partial-response equalized with a predetermined frequency characteristic using an equalizer, for example, is produced and then this signal is decoded into most likely (or most probable) digitized data (i.e., binary data) by a Viterbi decoding technique, for example. In this manner, data can be decoded at a low error rate even from a read signal with a low signal-to-noise ratio (SNR) or with a relatively high level of jitter resulting from intersymbol interference.

Hereinafter, a magnetic disk drive (i.e., HDD) that utilizes the conventional PRML method will be described with reference to FIG. 8. To reproduce digital information that has been recorded on a magnetic disk 11, the magnetic disk drive 200 includes magnetic head 12, automatic gain controller (AGC) 3, waveform equalizer (EQ1) 40, clock generator 6, analog-to-digital converter (ADC) 8 and PRML circuit 10.

A signal, which has been read out by the magnetic head 12 from the magnetic disk 11, has its amplitude controlled to a predetermined level by the AGC 3. Next, the amplitude-controlled signal has its waveform shaped by the waveform equalizer 40 so that the high-frequency components thereof are boosted. Then, the output signal 141 of the waveform equalizer 40 is input to both of the ADC 8 and the clock generator 6.

The clock generator 6 includes a phase-locked loop (PLL) circuit and generates a clock signal using a voltage-controlled oscillator (VCO). As will be described later, the clock signal generated has its phase controlled by a phase shifter 7 and then output to the ADC 8.

In response to the clock signal that has been received from the phase shifter 7, the ADC 8 samples the output signal 141 of the waveform equalizer 40, thereby generating a digital signal (or digital samples) 81. The digital signal 81 output from the ADC 8 has a value falling within a limited range. For example, where the resolution is 8 bits, the digital signal 81 can represent a value of 0 to 255 according to the decimal notation.

The digital signal 81 obtained in this manner is input to the PRML circuit 10 and a phase control signal generator 9. The phase control signal generator 9 is provided to appropriately control the phase of the clock signal 61. Specifically, responsive to the digital signal 81 received, the phase control signal generator 9 generates a phase control signal 91 and outputs the signal 91 to the phase shifter 7. A more detailed configuration of the phase control signal generator 9 is described in Japanese Laid-Open Publication No. 10-228733, for example.

The PRML circuit 10 includes a digital equalizer 10a and a most likelihood (ML) detector 10b such as a Viterbi decoder. The digital signal 81, which has been input to the PRML circuit 10, is equalized by the digital equalizer 10a to have a predetermined PR characteristic and then decoded into digitized data by the ML detector 10b. In this manner, the PRML circuit 10 can reproduce data accurately enough even from a signal with a relatively high level of jitter resulting from the intersymbol interference.

Next, the waveform equalizer 40 will be described in further detail with reference to FIG. 9. As shown in FIG. 9, the waveform equalizer 40 includes delay circuits 42a and 42b, amplifiers 43a and 43b and adder 44, and operates in such a manner as to amplify the high-frequency band of its input signal. Thus, the waveform equalizer 40 can amplify a signal corresponding to a recording pattern in which a number of transitions occur successively within a short period of time (i.e., a signal with a high frequency). The waveform equalizer 40 can reduce unwanted effects of the intersymbol interference on such a signal pattern and suppress the jitter.

As shown in FIG. 8, the output signal 141 of the waveform equalizer 40 is converted by the ADC 8 into digital data, which is then decoded by the PRML circuit 10. The digital data is also used to get a read clock signal extracted by the clock generator 6. In any of these circuits, a signal should preferably have its high-frequency components amplified to a certain degree and have its jitter reduced.

The PRML circuit 10 decodes the digitized data from the sampled data. By getting the high-frequency components of a signal amplified in advance by the waveform equalizer 40, the ADC 8 can sample such signal components at a sufficiently high quantization precision. The clock generator 6 extracts the read clock signal from the read signal. In this case, the clock generator 6 can also generate the read clock signal more appropriately if the read signal has had its high-frequency components amplified and if the jitter on the read signal is reduced.

In this manner, by subjecting the signal that will be input to the PRML circuit 10 and clock generator 6 to the equalization processing in advance using the waveform equalizer 40, information can be reproduced more accurately.

However, if data is recorded at an even higher density, the unwanted effects of the intersymbol interference further increase. Then, it is even more difficult to read a signal accurately enough. To realize a higher-density recording operation in the field of optical disk drives, in particular, a reproducing apparatus such as that illustrated in FIG. 8 might sometimes be unable to reduce the error rate sufficiently.

On an optical disk, for example, digital information is recorded as marks and spaces. Generally speaking, a shorter mark (or space) is recognized as a signal with smaller amplitude. To identify a signal like this (i.e., a high-frequency signal with a small intensity) accurately, the waveform equalizer 40 should have its equalization characteristics controlled appropriately. For the reproducing apparatus shown in FIG. 8, however, it is not easy to control and optimize the equalization characteristics of the waveform equalizer 40 so that a signal can be read accurately enough. Hereinafter, the reasons will be described in further detail.

Where the PRML decoding technique is adopted as in the foregoing example, a read signal should be A/D converted by sampling the signal once a channel bit period. However, to obtain an intended sampling clock signal corresponding to the channel bit period, the read signal should have its jitter reduced sufficiently before supplied to the clock generator. This is because if the read signal has a jitter of a non-negligible level, then the clock generator 6 cannot extract the desired read clock signal.

Furthermore, if the storage medium is a removable one such as an optical disk, it is even more difficult to generate the read clock signal as intended. This is because data may be written or read on/from an optical disk using mutually different drives. Accordingly, when a signal is read out from the disk, the read signal might have wow (i.e., a small variation in transfer rate). To generate a clock signal from such a read signal with wow, the PLL circuit should have a gain high enough to follow up the read signal. However, where the gain of the PLL circuit has been increased, a read signal with a non-negligible jitter will cause a bit slip error. In that case, even if the read signal is subjected to the PRML processing after that, non-correctible errors should occur.

Accordingly, to generate the intended clock signal, the read signal should preferably be subjected to the waveform equalization in such a manner as to have its jitter minimized.

However, if the equalization characteristics of the waveform equalizer 40 are optimized (e.g., by controlling the equalization level K of the amplifiers 43a and 43b in the equalizer 40) for the jitter reduction purpose, then the resultant equalization characteristics will not match the PRML method, thus possibly increasing the error rate unintentionally. In the PRML decoding method, the read signal that will be input to the ML detector should preferably be equalized so that the read/write signal processing system, including the storage medium such as an optical disk, has its frequency response characteristic adapted to the predetermined partial response. Accordingly, if the equalization characteristics of the equalizer 40 do not match the desired PR equalization, it is difficult to read the signal accurately. That is to say, appropriate equalization characteristics should be selected for the equalizer 40 so that the equalization characteristics are compatible with the predetermined PRML decoding method and that the jitter of the read signal can be reduced.

Also, in obtaining phase deviation information of the sampling clock signal from the digital read signal, the phase control signal generator 9 measures an unwanted phase deviation of the sampling clock signal by the amplitude level of the digital read signal. In this case, if the waveform equalizer 40 has too small an equalization level K, then the phase deviation detected when a short mark is read becomes different from the phase deviation detected when a long mark is read even though these phase deviations are actually equal to each other. Accordingly, the equalization level K of the waveform equalizer 40 needs to be increased to a certain degree. However, if the equalization level K is increased excessively, then the intersymbol interference rather increases and the PR equalization cannot be carried out as intended later.

As described above, in the conventional information reproducing apparatus, appropriate equalization characteristics should be selected for the waveform equalizer in view of a number of considerations including intended clock signal generation and accurate information signal decoding. Thus, as the recording density is further increased, it becomes more and more difficult to make the best selection for an optical disk drive, in particular.

SUMMARY OF THE INVENTION

In order to overcome the problems described above, an object of the present invention to provide an apparatus that can reproduce information at a lower error rate by subjecting a signal, read out from a storage medium, to appropriate equalization processing.

An information reproducing apparatus according to the present invention reproduces information that has been digitally recorded on a storage medium. The apparatus includes first and second waveform equalizers. The first waveform equalizer equalizes a read signal, corresponding to the information read out from the storage medium, thereby outputting a first equalized signal. The a second waveform equalizer has an equalization characteristic different from that of the first waveform equalizer, outputs a second equalized signal and is selectively used to extract a read clock signal.

In a preferred embodiment of the present invention, the second equalized signal is used exclusively for extracting the read clock signal and the information is not extracted from the second equalized signal.

In another preferred embodiment of the present invention, the second waveform equalizer has such an equalization characteristic as to emphasize high-frequency components of an input signal more strongly than the first waveform equalizer does.

In still another preferred embodiment, the apparatus may further include: a clock generator for outputting the read clock signal responsive to the second equalized signal; and a decoder for generating digitized data from the first equalized signal.

In this preferred embodiment, the apparatus may further include phase shifter, A/D converter and phase control signal generator. Responsive to a phase control signal, the phase shifter shifts the phase of the read clock signal that has been output from the clock generator, thereby outputting a phase-shifted read clock signal as a sampling clock signal. The A/D converter converts the first equalized signal into a digital read signal by sampling the first equalized signal by reference to the sampling clock signal that has been output from the phase shifter. The phase control signal generator detects a phase deviation of the sampling clock signal in accordance with the digital read signal that has been output from the A/D converter, thereby outputting the phase control signal to the phase shifter to reduce the phase deviation of the sampling clock signal. The decoder generates the digitized data from the digital read signal that has been output from the A/D converter.

In an alternative embodiment, the decoder may perform its decoding operation in accordance with a pattern of a digital read signal that has been obtained by sampling the first equalized signal.

In this particular embodiment, the decoder preferably operates in accordance with a PRML method.

In yet another preferred embodiment, the storage medium may be an optical disk.

As used herein, "to equalize a signal" means to control the overall frequency characteristic of the signal by finely adjusting the degree of amplification or attenuation of the signal according to the frequency band thereof. Thus, any electric circuit that performs such an operation will be herein referred to as an "equalizers".

DETAILED DESCRIPTION OF PREFERRED EMBODIMENTS

Hereinafter, an optical disk drive according to a preferred embodiment of the present invention will be described with reference to the accompanying drawings.

Figure 1:
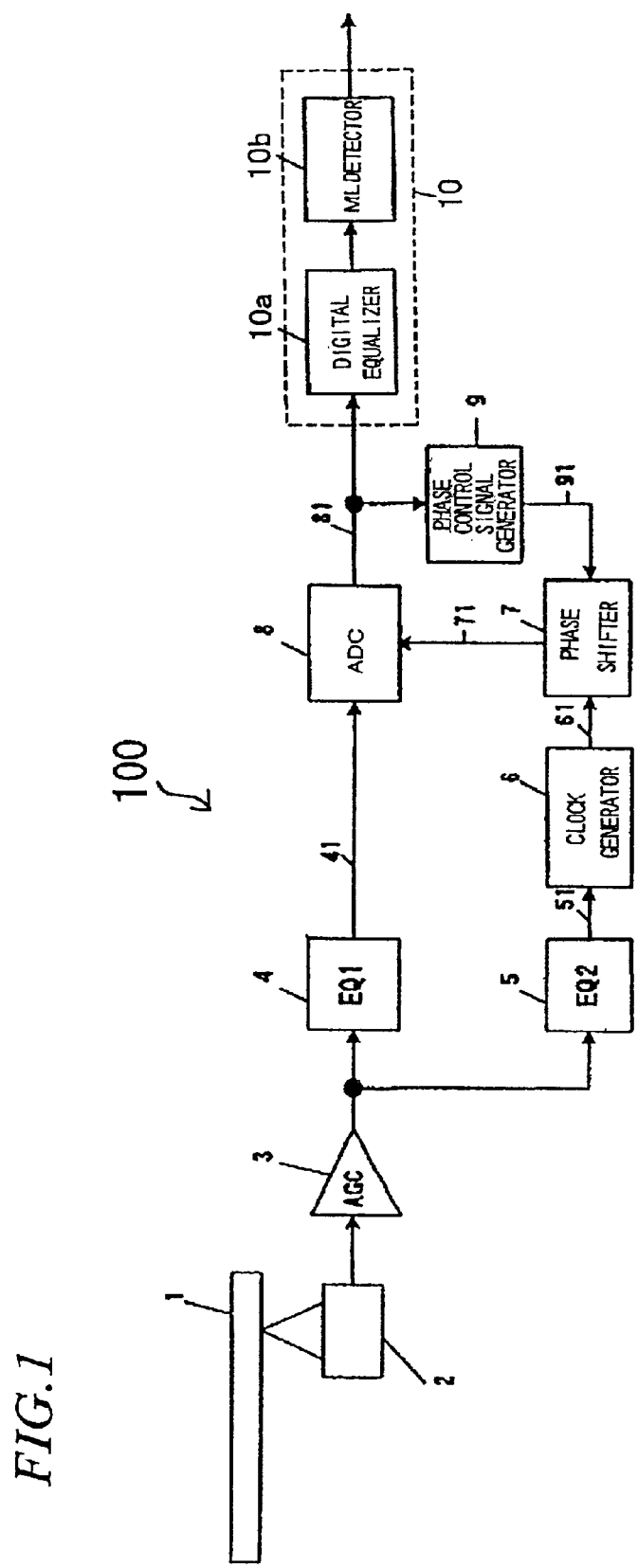
FIG. 1 is a block diagram illustrating a configuration for an optical disk drive according to a preferred embodiment of the present invention.

FIG. 1 is a block diagram illustrating an overall configuration for an optical disk drive 100 according to a preferred embodiment of the present invention. The optical disk drive 100 is used to reproduce digital data, which has been written as marks or spaces on an optical disk 1, by a PRML decoding technique. As shown in FIG. 1, the optical disk drive 100 includes optical head 2, automatic gain controller (AGC) 3, first and second waveform equalizers (EQ1 and EQ2) 4 and 5, clock generator 6, A/D converter (ADC) 8 and PRML circuit 10. The EQ2 5 has an equalization characteristic different from that of the EQ1 4. The clock generator 6 extracts a clock signal synchronized with a read signal. The PRML circuit 10 includes a digital equalizer 10a and an ML detector 10b.

The optical head 2 reads out the digital data from the optical disk 1 and outputs an analog read signal corresponding to the digital data. The output signal of the optical head 2 is input to the AGC 3, which controls the amplitude thereof to a predetermined value. The AGC 3 is provided to eliminate an unwanted variation in amplitude of the read signal due to a variation in reflectance of the rotating optical disk 1, for example. The read signal that has had its amplitude controlled by the AGC 3 is input to the EQ1 4 and EQ2 5.

Figure 2A:
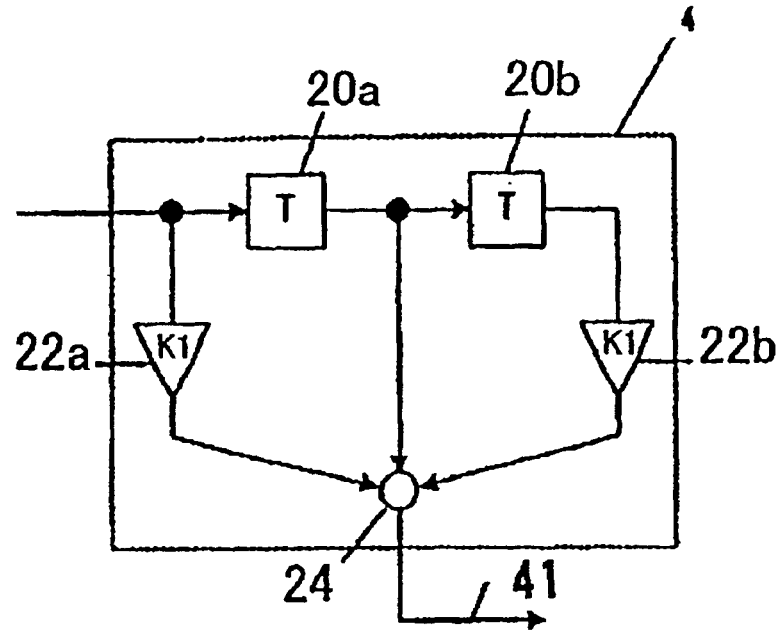
FIGS. 2A and 2B are circuit diagrams illustrating respectively preferred configurations for the first and second waveform equalizers shown in FIG. 1.
Figure 2B:
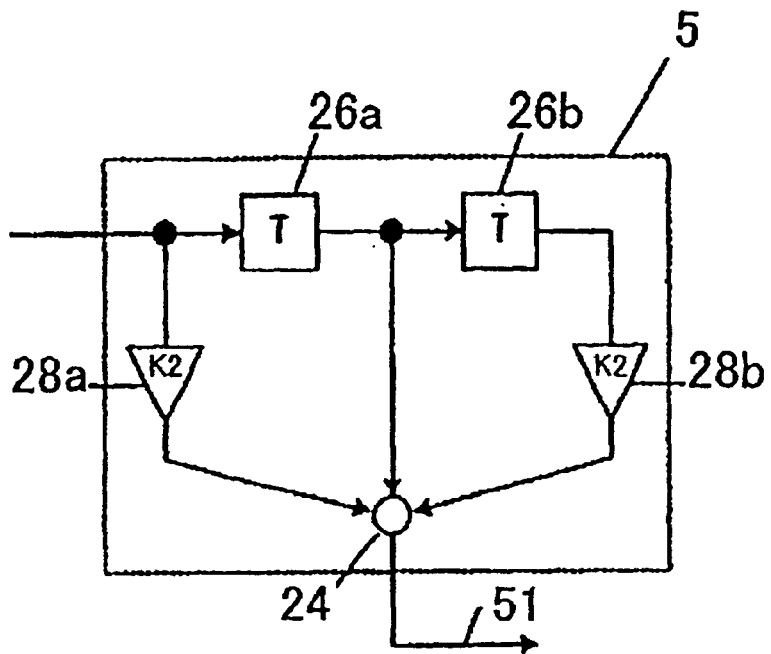

FIGS. 2A and 2B illustrate circuit configurations for the EQ1 and EQ2 4 and 5, respectively. As shown in FIG. 2A, the EQ1 4 includes delay circuits 20a and 20b, amplifiers 22a and 22b and adder 24, and outputs an equalized signal 41. On the other hand, the EQ2 5 includes delay circuits 26a and 26b, amplifiers 28a and 28b and adder 24, and outputs an equalized signal 51 as shown in FIG. 2B.

These waveform equalizers 4 and 5 have similar configurations. However, these equalizers 4 and 5 are different in that the amplifiers 22a and 22b of the EQ1 4 have an equalization level K1 while the amplifiers 28a and 28b of the EQ2 5 have an equalization level K2. Accordingly, the equalization characteristic of the EQ1 4 is different from that of the EQ2 5. In this preferred embodiment, the equalization level K1 is smaller than the equalization level K2. That is to say, the equalization level of the EQ2 5 is greater than that of the EQ1 4. More specifically, the EQ2 5 equalizes its input signal so as to boost the high-frequency components thereof more strongly than the EQ1 4.

In the embodiment illustrated in FIGS. 2A and 2B, the delay parameter T of the delay circuits 20a and 20b of the EQ1 4 is the same as that of the delay circuits 26a and 26b of the EQ2 5. Alternatively, these waveform equalizers 4 and 5 may have mutually different delay parameters T if necessary. Also, in the illustrated embodiment, each of the waveform equalizers 4 and 5 has three taps. However, these waveform equalizers 4 and 5 may have any other configuration. That is to say, each of these equalizers 4 and 5 may have any arbitrary number of taps.

Figure 3:
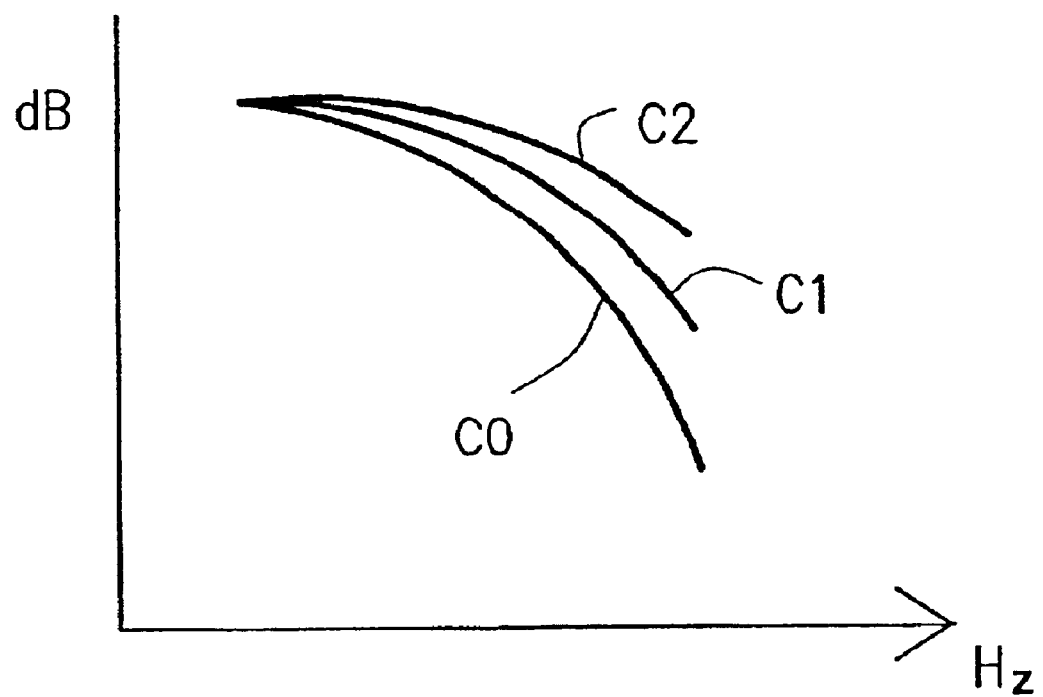
FIG. 3 is a graph showing respective frequency characteristics of a read signal yet to have its waveform equalized (C0), an equalized signal output from the first waveform equalizer (C1), and an equalized signal output from the second waveform equalizer (C2).

FIG. 3 is a graph showing the frequency characteristics of the input signal and output signals 41 and 51 of the EQ1 4 and EQ2 4. Specifically, this graph shows the characteristic C0 of the read signal yet to be input to the EQ1 4 and EQ2 5 and the characteristics C1 and C2 of the signals that have been equalized by the EQ1 4 and EQ2 5, respectively. As can be seen from FIG. 3, the EQ1 4 and EQ2 5 each amplify higher frequencies of their input signal. More specifically, the EQ2 5 has an equalization level greater than that of the EQ1 4 and equalizes the read signal in such a manner as to boost the high-frequency components thereof more strongly than the EQ1 4.

Referring back to FIG. 1, the equalized read signal 41 that has been equalized by the EQ1 4 is input to the ADC 8, where the signal 41 is converted into a digital signal 81. Then, the digital signal 81 is input to a phase control signal generator 9 and the PRML circuit 10. The PRML circuit 10 includes a digital equalizer 10a and a most likelihood (ML) detector 10b such as a Viterbi detector. The digital signal 81 that has been input to the PRML circuit 10 is equalized by the digital equalizer 10a in accordance with a predetermined PR characteristic. Next, the equalized signal is decoded by the ML detector 10b into binary data (i.e., zeros and ones), which is then output to an external unit. More specifically, in accordance with a pattern of the equalized digital samples, the ML detector 10b decodes the digital data that has been stored on the disk 1.

On the other hand, the equalized signal 51 that has been output from the EQ2 5 is input to the clock generator 6 for extracting a read clock signal in synchronization with a channel clock signal. The clock generator 6 may include a PLL circuit, for example, and generate a clock signal (i.e., read clock signal) 61 that has been synchronized with the read signal using a VCO, for example. The read clock signal 61 is used as a sampling clock signal to determine a sampling timing for the ADC 8.

In this preferred embodiment, signals, which have been equalized by the EQ1 4 and EQ2 5 having mutually different equalization characteristics, are input to a read signal decoding section including the PRML circuit 10 and a read clock signal extracting section including the clock generator 6, respectively. Hereinafter, it will be described why this configuration is preferred.

Generally speaking, an equalization level optimized for a PRML decoding method is different from an equalization level at which the jitter can be minimized. For example, in decoding a (1, 7) RLL (run-length-limited) modulated signal by a PR (1, 2, 2, 1) ML technique, even if a read signal corresponding to the shortest mark has a relatively small amplitude (i.e., too small to generate a clock signal accurately), data still can be decoded correctly using marks preceding and succeeding the shortest mark. Alternately, in decoding such a signal by a PR (1, 2, 2, 2, 1) ML technique, even if the transition of a signal corresponding to the shortest mark is totally absent from the waveform of a read signal, data can also be decoded correctly using marks preceding and succeeding the shortest mark. That is to say, the key to the PRML processing is not the amplitude of the signal corresponding to the shortest mark but the degree of correspondence between the modulation transfer function (MTF) of a reading circuit section and the response coefficient (e.g., PR (1, 2, 2, 1) equalization characteristics).

For this reason, the EQ1 4 has such an equalization characteristic as not to boost or emphasize the high-frequency components of the read signal so intensely as the EQ2 5 does. The PRML decoding technique expects the potential occurrence of intersymbol interference. That is to say, the PRML decoding is a method for decoding digitized data correctly in accordance with a pattern of a digital signal that has been produced from a signal with intersymbol interference. Accordingly, in the PRML decoding, there is no need to boost the high-frequency components of a signal to such a degree that every transition of the signal is completely identifiable. Thus, in this preferred embodiment, the equalization characteristic of the EQ1 4 is defined so that the digital signal to be input to the ML detector 10b is equalized in accordance with a predetermined PR characteristic.

In generating a clock signal on the other hand, if the transition of a signal corresponding to the shortest mark is totally absent from the waveform of a read signal, then the edge of the signal (i.e., a point in time when the signal crosses a predetermined level) cannot be located, thus increasing the jitter considerably. Or in the worst case scenario, a bit slip error occurs. Accordingly, as for the signal to be supplied to the clock generator 6, even the signal corresponding to the shortest mark should have an amplitude great enough to be sliced or digitized. For that reason, the EQ2 5 has a sufficiently large equalization level K2. Preferably, the equalization level K2 is optimized in such a manner as to minimize the jitter of the signal to be input to the clock generator 6.

In this preferred embodiment, the equalization characteristic of the EQ1 4 is controlled so as to comply with the predetermined PRML decoding method, while the equalization characteristic of the EQ2 5 is optimized so as to extract the read clock signal accurately enough. In this manner, information can be reproduced much more correctly.

Also, the optical disk drive 100 includes the phase control signal generator 9. In response to the digital signal 81 that has been output from the ADC 8, the phase control signal generator 9 generates a phase control signal 91 and outputs the signal 91 to the phase shifter 7. In the phase shifter 7, the phase control signal 91 is used to adjust the phase of the read clock signal 61 supplied from the clock generator 6. The clock signal 71, which has had its phase controlled in this manner, is input to the ADC 8 and used as a sampling clock signal for determining the timing of A/D conversion.

Figure 4:
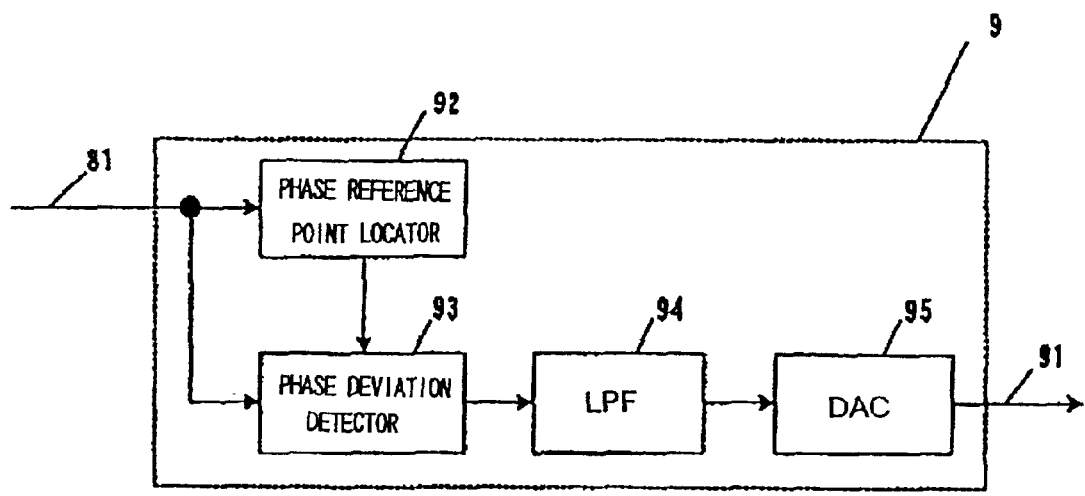
FIG. 4 is a block diagram illustrating an exemplary configuration for the phase control signal generator shown in FIG. 1.

The phase control signal generator 9 contributes to controlling the phase of the read clock signal 61 so that digital samples, suited to the PRML technique for the PRML circuit 10, can be obtained. FIG. 4 illustrates an exemplary configuration for the phase control signal generator 9. As shown in FIG. 4, the phase control signal generator 9 includes phase reference point locator 92, phase deviation detector 93, low-pass filter (LPF) 94 and digital-to-analog converter (DAC) 95.

Figure 5A:
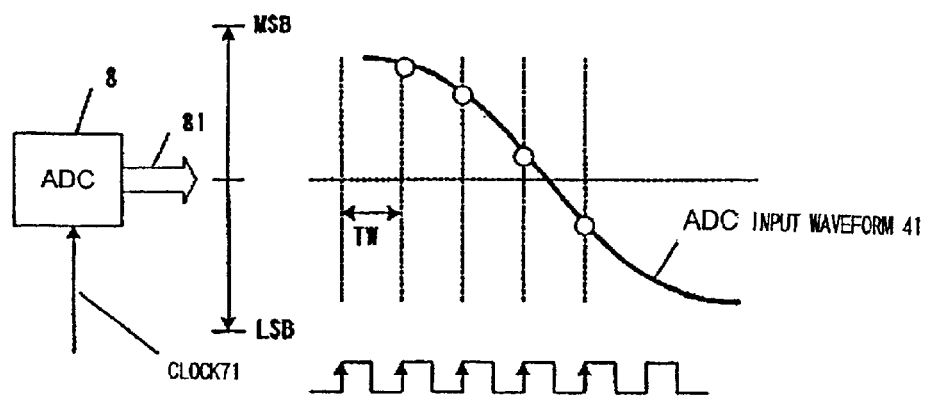
FIGS. 5A through 5C illustrate relationships between the input waveforms of an A/D converter and the phase control reference points.
Figure 5B:
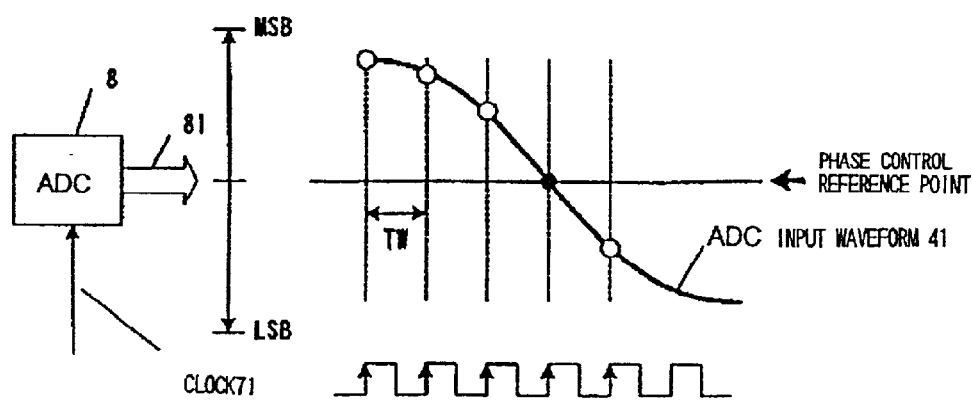
Figure 5C:
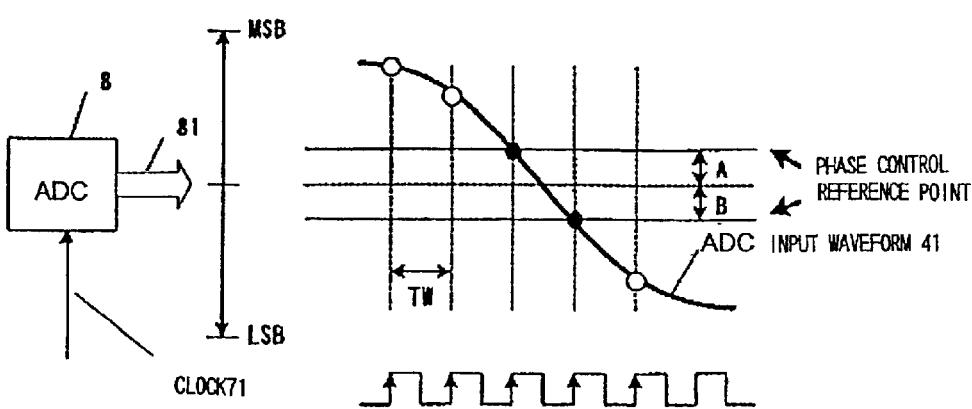

FIGS. 5A through 5C each show a relationship between the waveform of the signal input to the ADC 8 and the signal detection timings (i.e., the phase of the clock signal 71). In FIGS. 5A through 5C, MSB and LSB respectively denote the most and least significant bits of the dynamic range (D-range) of the ADC 8 and TW denotes a time width corresponding to one channel bit period.

FIG. 5A illustrates a situation where the clock signal 61 output from the clock generator 6 is A/D converted at initial phase clock timings without being subjected to any phase control.

On the other hand, FIG. 5B illustrates a situation where a phase control reference point is set at the center of the D-range of the ADC 8 (e.g., at 128 (according to the decimal notation) where the resolution is 8 bits). The digital sample 81 is input from the ADC 8 to the phase reference point locator 92 of the phase control signal generator 9. In this case, if the sample input has a level close to the preset phase reference point, then the phase reference point locator 92 outputs a trigger signal to the phase deviation detector 93. Only when the trigger signal is input thereto, the phase deviation detector 93 outputs the value of the sampled data as phase deviation information. The phase deviation information can be obtained in this manner. This is because if the phase of the sampling clock signal has deviated from the desired phase, then the deviation should be reflected on the difference between the predetermined phase reference point and the sample value at the phase reference point. The phase deviation information obtained in this manner is output to the phase shifter 7 by way of the LPF 94 and DAC 95. This feedback loop realizes a phase control in such a manner as to reduce the phase deviation.

FIG. 5C illustrates a situation where two phase control reference points are set so as to have shifted from the center of the D-range shown in FIG. 5B by a phase angle of ±180 degrees of the clock signal. In this case, the phase of the sampling clock signal should be feedback controlled so that the digital signal 81 output from the ADC 8 satisfies the equation of |A|=|B| (where A represents a difference between the center of the D-range and one of the phase control reference points and B represents a difference between the center of the D-range and the other phase control reference point). Also, the phase points shown in FIG. 5C have shifted from the phase point shown in FIG. 5B just by ±180 degrees. Accordingly, a control technique similar to that adopted for the signal shown in FIG. 5B is also applicable to the signal shown in FIG. 5C by inverting the clock signal while performing a phase control with respect to the phase point shown in FIG. 5B. In that case, however, the sampling clock signal should have a duty of 50%.

A phase control like this is preferably optimized for a PRML technique adopted. Hereinafter, a relationship between the PRML technique and the phase of the clock signal will be described. For example, where the modulation rule adopted uses a codeword with a minimum code length of 3 T (e.g., EFM (eight to fourteen modulation) or EFM-plus code) and where a PR (a, b, a) ML technique with a PR length of 3 is adopted, the number of possible signal levels is four (i.e., 0, a, a+b, and 2a+b). In that case, the phase is preferably controlled with respect to the phase control reference points shown in FIG. 5C. On the other hand, where a PR (a, b, b, a) ML technique with a PR length of 4 is adopted, the number of possible signal levels is five (i.e., 0, a, a+b, a+2b and 2a+2b). In that case, the phase is preferably controlled with respect to the phase control reference point shown in FIG. 5B.

Where the modulation rule adopted uses a codeword with a minimum code length of 2 T (e.g., (1, 7) RLL modulation) and where a PR (a, b, a) ML technique with a PR length of 3 is adopted, the number of possible signal levels is also four as in the situation where the minimum code length is 3 T. In that case, the phase is preferably controlled with respect to the phase control reference points shown in FIG. 5C. On the other hand, where a PR (a, b, b, a) ML technique with a PR length of 4 is adopted, the number of possible signal levels is seven (i.e., 0, a, 2a, a+b, 2b, a+2b and 2a+2b). In that case, the phase is preferably controlled with respect to the phase control reference point shown in FIG. 5B. Supposing the marks and spaces have the same run length, the phase control is preferably performed with respect to the phase control reference point shown in FIG. 5B where there are an odd number of possible signal levels and to the phase control reference points shown in FIG. 5C where there are an even number of possible signal levels.

The phase shifter 7 changes the phase delay in accordance with a voltage variation represented by the phase control signal 91 that has been output from the phase control signal generator 9. In this manner, the phase-shifted clock signal (i.e., sampling clock signal) 71 input to the ADC 8 is feedback controlled so that the processing will be carried out appropriately by the processing blocks succeeding the ADC 8. By using the phase control signal generator 9 and phase shifter 7 in this manner, the phase of the clock signal can be controlled in accordance with the PRML technique adopted and a waveform suited to the processing to be performed by the PRML circuit 10 can be input to the PRML circuit 10.

Next, another preferred embodiment of the present invention using a waveform equalizer of a type different from the waveform equalizer 5 will be described.

In an optical disk drive in general, the disk being rotated often tilts due to the warp of the disk itself, thus causing a variation in the amplitude of a read signal waveform. It depends on the frequency band of the read signal how much the amplitude of the waveform changes. Also, while data is being written on an optical disk, the optical power of the laser radiation is variable unexpectedly to increase or decrease the size of a resultant recorded mark compared to its intended size. As a result, the read signal has asymmetric amplitude. The degree of this asymmetry also depends on the frequency band of the read signal. The signal waveform variation brought about in this manner does not show linearity with respect to the frequency. Accordingly, if such non-linearity unique to the optical disk increases excessively, it becomes even more difficult to extract a read clock signal accurately enough. This is particularly true of an optical disk on which data has been recorded at so high a density that the signal read out therefrom should be affected by the intersymbol interference very seriously. Then, sufficient reproduction performance is not realizable.

Figure 6:
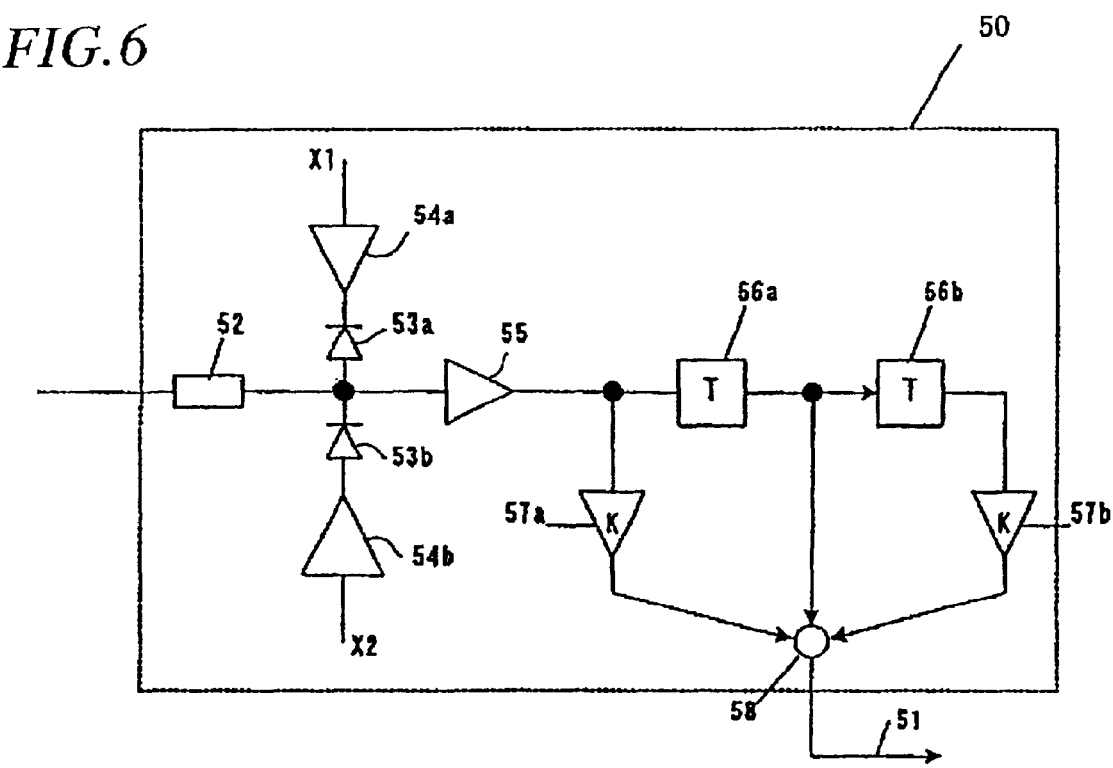
FIG. 6 is a circuit diagram illustrating another type of second waveform equalizer according to another preferred embodiment of the present invention.

In view of these considerations, the EQ2 5 shown in FIG. 2B may be replaced with a waveform equalizer 50 including an amplitude limiter such as that illustrated in FIG. 6. In that case, the jitter of the read signal can be further reduced and a clock signal can be extracted even more accurately. As for a waveform equalizer including an amplitude limiter, see Japanese Patent Application No. 11-308867 and Japanese Laid-Open Patent Publication No. 11-259985, for example.

First, the waveform equalizer 50 shown in FIG. 6 will be described. As shown in FIG. 6, the waveform equalizer 50 includes resistor 52, diodes 53a and 53b, buffers 54a, 54b and 55, delay circuits 56a and 56b, amplifiers 57a and 57b, and adder 58. Signals X1 and X2, specifying the upper and lower limit voltages of an input waveform, are supplied to the input terminals of the buffers 54a and 54b, respectively.

If the waveform equalizer 50 is used, the read signal can have its amplitude limited intentionally using the signals X1 and X2 and then equalized at a relatively large equalization factor. In this manner, it is possible to avoid an unwanted situation where the jitter is rather increased by getting the high-frequency components boosted by the waveform equalizer. Thus, the jitter is expectedly reduced considerably with this alternative waveform equalizer 50.

Figure 7A:
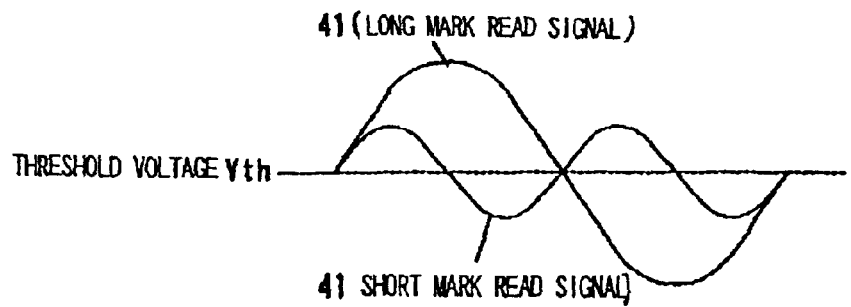
FIGS. 7A through 7C illustrate the waveforms of signals output from the waveform equalizers shown in FIGS. 6 and 9.
Figure 7B:
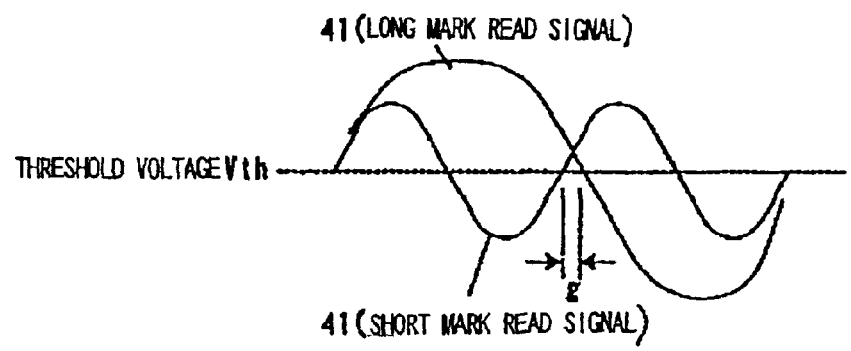
Figure 7C:
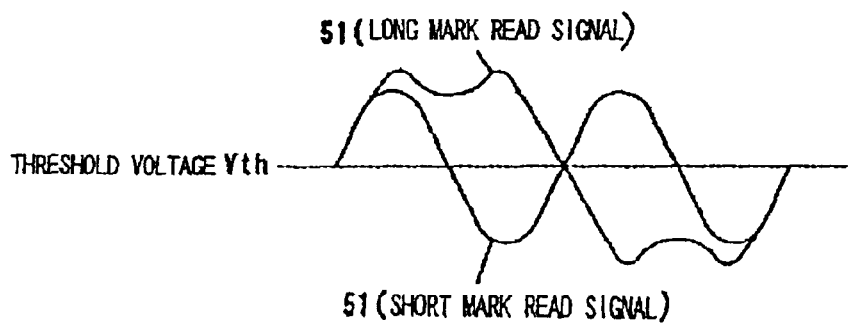
Figure 8:
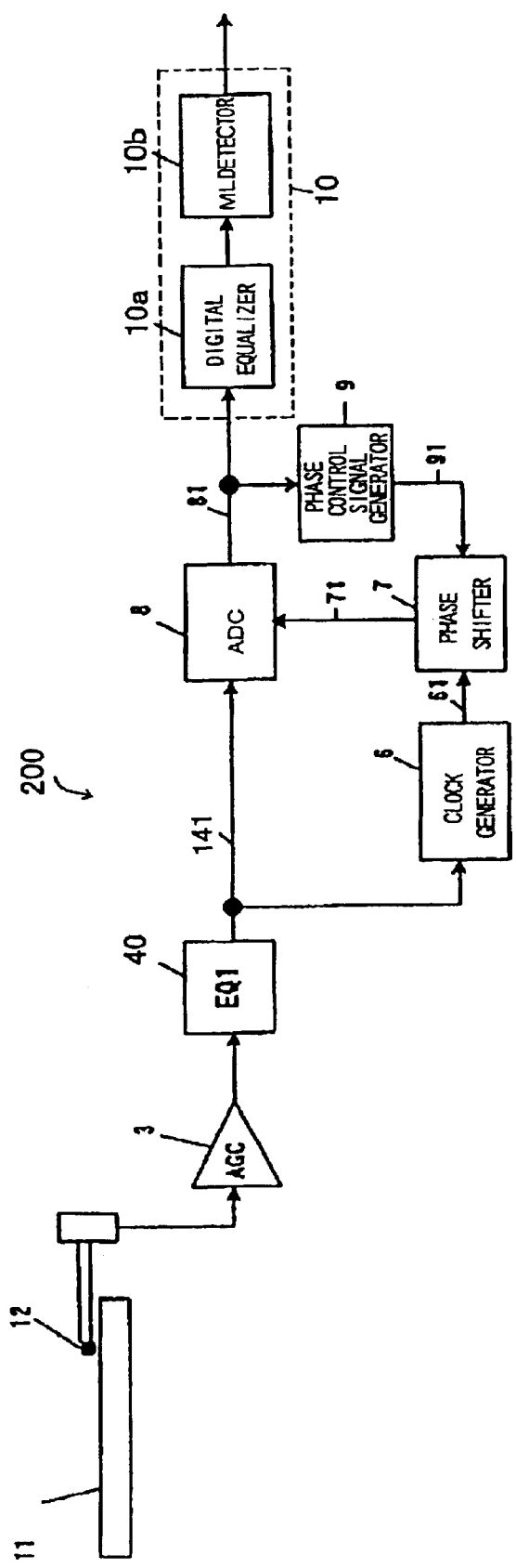
FIG. 8 is a block diagram illustrating a configuration for a conventional magnetic disk drive.

Hereinafter, it will be briefly described with reference to the output waveforms of the waveform equalizers as shown in FIGS. 7A through 7C why the jitter can be reduced by using the waveform equalizer 50.

Figure 9:
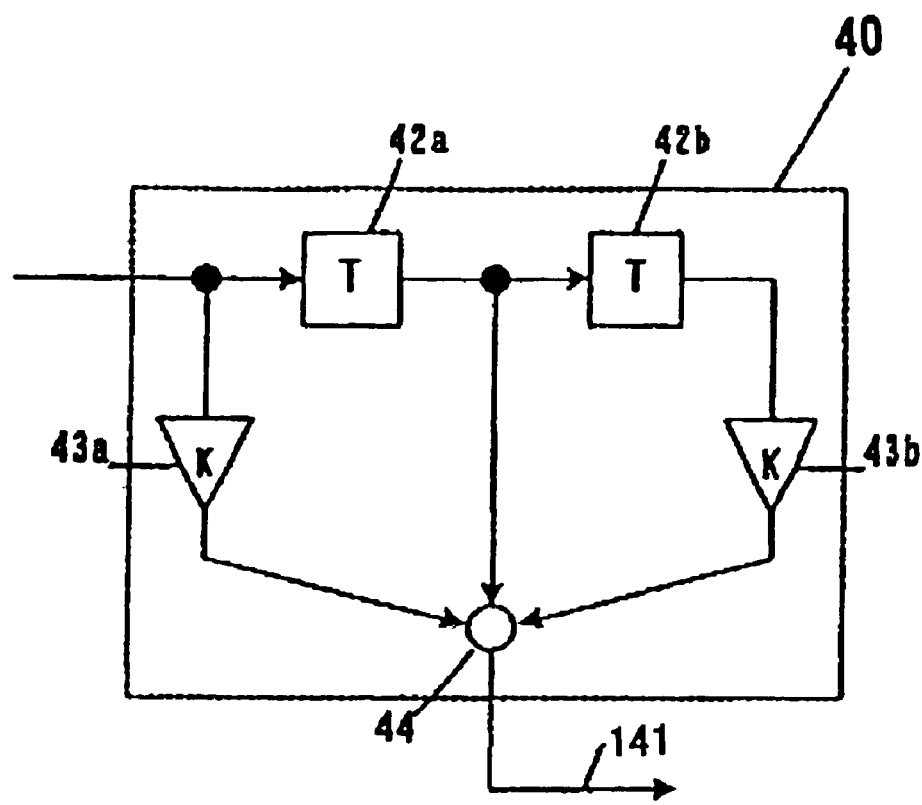
FIG. 9 is a circuit diagram illustrating a configuration for a conventional waveform equalizer.

For example, if the read signal is not equalized by the waveform equalizer 40 shown in FIG. 9 (i.e., just passed without having its waveform processed at all) or if the equalization level K is small, then the output signal of the waveform equalizer 40 will have one of the waveforms shown in FIG. 7A. Specifically, the intersection between a long mark read signal and a threshold voltage Vth matches the intersection between a short mark read signal and the threshold voltage Vth. In this case, however, the high-frequency components of the read signal are not boosted sufficiently and the jitter cannot be reduced so much.

On the other hand, if the equalization level K of the waveform equalizer 40 is increased, then the intersection of the long mark read signal with the threshold voltage Vth will shift by g as shown in FIG. 7B. As a result, jitter is newly caused in the read signal. The higher the recording density and the greater the equalization level K, the more remarkable this new jitter will be.

That is to say, if the equalization level K is increased within a certain range to reduce the intersymbol interference, the jitter can also be reduced within that limited range. However, even if the equalization level K is increased beyond that range, the jitter cannot be reduced but rather increased because jitter is newly caused as described above. Since such a tradeoff is inevitable, it may be difficult to reduce the jitter greatly by using a circuit like the waveform equalizer 40.

In contrast, where the waveform equalizer 50 shown in FIG. 6 is used as the second waveform equalizer to prelimit the amplitude of the long mark read signal to a predetermined range before the waveform thereof is equalized, the new jitter g will not be caused in the output signal of the waveform equalizer 50 as shown in FIG. 7C even if the equalization level K is set relatively high. Consequently, the jitter of the read signal can be reduced noticeably.

However, where the waveform equalizer 50 is used, the long mark read signal will have an M-shaped output waveform as shown in FIG. 7C because the amplitude thereof has been limited in advance. Accordingly, if a PRML circuit is connected to the waveform equalizer 50 to decode data from the output signal of the waveform equalizer 50, it is difficult to decode the data appropriately. This is because in a PRML signal processing technique, a most likely data sequence is decoded by selecting a pattern closest to the input waveform of a read signal based on an information theory that the input waveform ideally has just a limited number of patterns. Accordingly, if the M-shaped waveform, which is not included in the expected input waveform patterns, is input, then the data sequence cannot be decoded correctly by the PRML signal processing technique. Thus, an input signal to be processed by the PRML technique should not be equalized by the waveform equalizer 50.

According to this preferred embodiment, the waveform equalizer 50 shown in FIG. 6 is used only as a waveform equalizer for extracting a clock signal, while another waveform equalizer 4 of the type shown in FIG. 2A is used as a waveform equalizer for equalizing a signal to be processed by the PRML technique. Thus, the jitter can be reduced greatly and yet the PRML signal processing can be carried out just as intended. Consequently, information can be reproduced much more accurately.

As described above, the information reproducing apparatus according to this preferred embodiment includes at least two waveform equalizers, i.e., a waveform equalizer for generating a clock signal and a waveform equalizer for decoding data. Thus, at least two optimum equalization characteristics may be separately defined for the respective purposes. For that reason, this apparatus can reproduce information very reliably at a low error rate even from an optical disk on which the information has been recorded at a high density.

In the preferred embodiment described above, the apparatus includes two waveform equalizers, namely, a waveform equalizer for extracting a clock signal and another waveform equalizer for decoding data and controlling the phase. However, the present invention is not limited to this particular embodiment, but is applicable to any other configuration. For example, the information reproducing apparatus of the present invention may include three waveform equalizers, i.e., a waveform equalizer for extracting a clock signal, another waveform equalizer for decoding data and a third waveform equalizer for controlling the phase. In other words, according to the present invention, the number of waveform equalizers is not particularly limited but any arbitrary number of waveform equalizers may be used for respective purposes.

Also, the number of taps, equalization level or circuit configuration does not have to be the same for all of those waveform equalizers. Instead, each of the waveform equalizers may have its own number of taps, equalization level and circuit configuration that are most appropriate for its purpose. In addition, each of those waveform equalizers may have any arbitrary equalization characteristics including the magnitude and center frequency of boosting.

In the preferred embodiment described above, the PRML circuit 10, including the digital equalizer 10a and ML detector 10b, is provided as a circuit succeeding the ADC 8. Alternatively, the digital equalizer 10a may be omitted and only the ML detector 10b may be provided posterior to the ADC 8. In that case, if the equalization characteristic of the EQ1 4 is appropriately controlled so that the frequency characteristic of the signal reading section is adapted to the predetermined PR equalization, then the PRML decoding operation can be carried out as intended.

Figure 10:
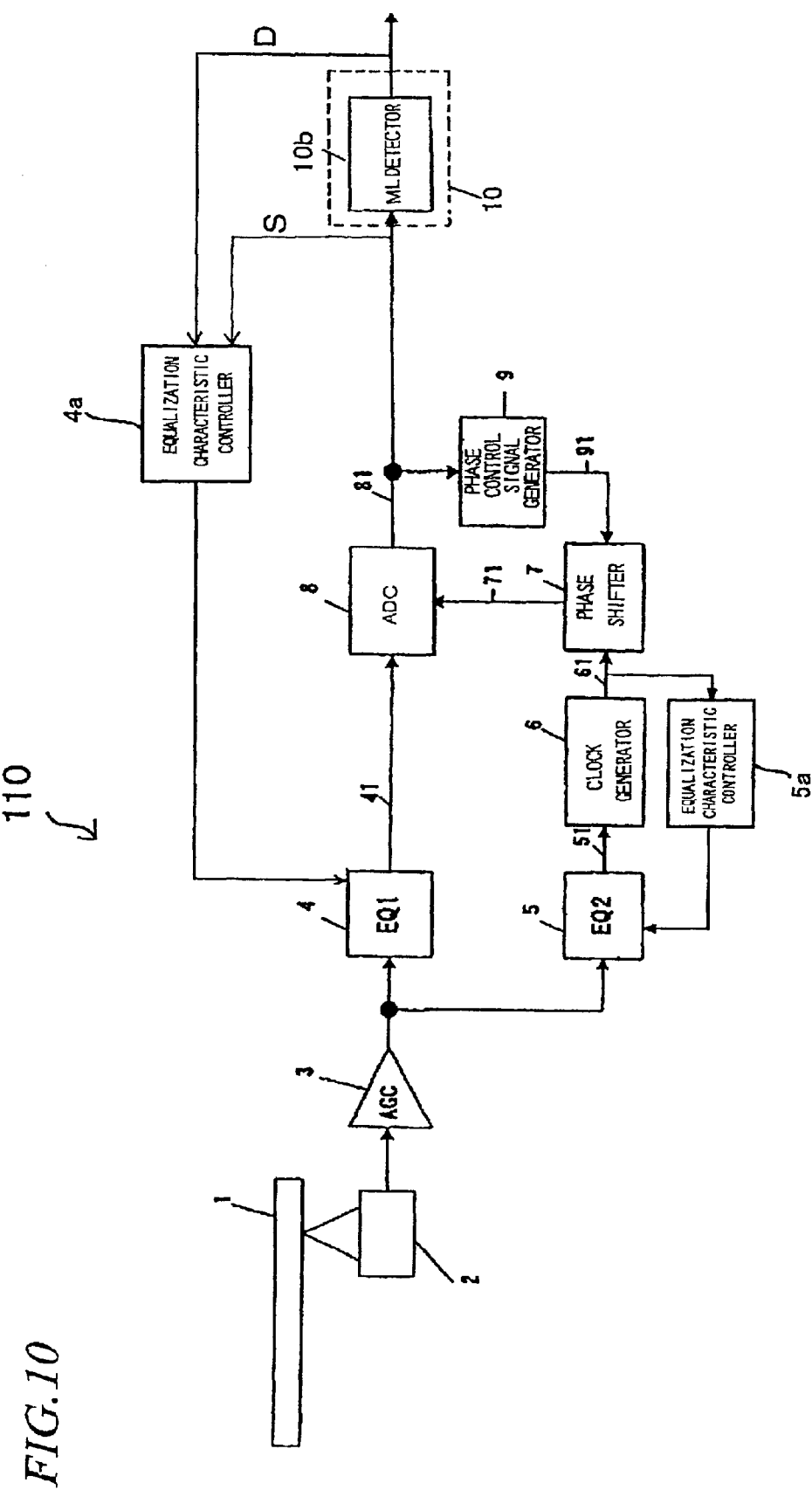
FIG. 10 is a block diagram illustrating a configuration for an optical disk drive according to still another preferred embodiment of the present invention.

Also, as in the information reproducing apparatus 110 shown in FIG. 10, the equalization characteristics (e.g., the equalization level K1) of the EQ1 4 may be feedback-controlled based on the digitized data, for example, by using an equalization characteristic controller 4a. In this embodiment, the equalization characteristics of the EQ1 4 are controlled appropriately, and therefore, there is no need to provide any digital equalizer as the first stage component of the ML detector 10b. Alternatively or additionally, the equalization characteristics (e.g., the equalization level K2) of the EQ2 5 may also be feedback-controlled based on the read clock signal 61, for example, by using an equalization characteristic controller 5a. It should be noted that each of the other components of the apparatus 110 may have the same configuration as the counterpart of the apparatus 100 shown in FIG. 1.

Hereinafter, it will be described how the equalization characteristic controller 4a of the reproducing apparatus 110 may operate.

The equalization characteristic controller 4a receives a signal S to be input to the ML detector 10b and a detection result D obtained by the ML detector 10b (i.e., a digitized signal of "0" or "1"). In accordance with the detection result D received from the ML detector 10b, the equalization characteristic controller 4a detects a part PA that has a minimum Euclidean distance from a state transition path that has been determined as most likely by the ML detector 10b. Once this part PA of the state transition path has been detected, another possible part PB of the state transition path is known.

In this case, the equalization characteristic controller 4a obtains a square JPA of a difference between the signal S and a read signal value estimated from the path part PA and a square JPB of a difference between the signal S and a read signal value estimated from the path part PB. Then, the controller 4a obtains a difference between these squares JPA and JPB, i.e., (JPA-JPB), and calculates an average or standard deviation of the (JPAJPB) distribution. The average or standard deviation value SE obtained in this manner is correlated to the error rate of the digitization result obtained by the ML detector 10b. That is to say, the smaller the SE value, the smaller the error rate of the result obtained by the ML detector 10b.

By using this SE value, the equalization characteristic controller 10a performs feedback control over the equalization characteristics of the EQ1 4. More specifically, the controller 10a controls the equalization characteristics (e.g., the equalization level K1) of the EQ1 4 in such a manner as to minimize the SE value. As a result, data with an even lower error rate can be obtained.

Next, it will be described how the equalization characteristic controller 5a of the reproducing apparatus 110 may operate. The clock generator 6 generates a clock signal by detecting a point in time at which the read signal crosses a predetermined level. The equalization characteristic controller 5a receives a time lag (i.e., jitter) between a point in time when the transition of the clock signal generated occurs and a point in time when the read signal crosses the predetermined level. To minimize this jitter, the equalization characteristic controller 5a performs feedback control over the equalization characteristics of the EQ2 5. As a result, an even more accurate read clock signal can be obtained.

Figure 11:
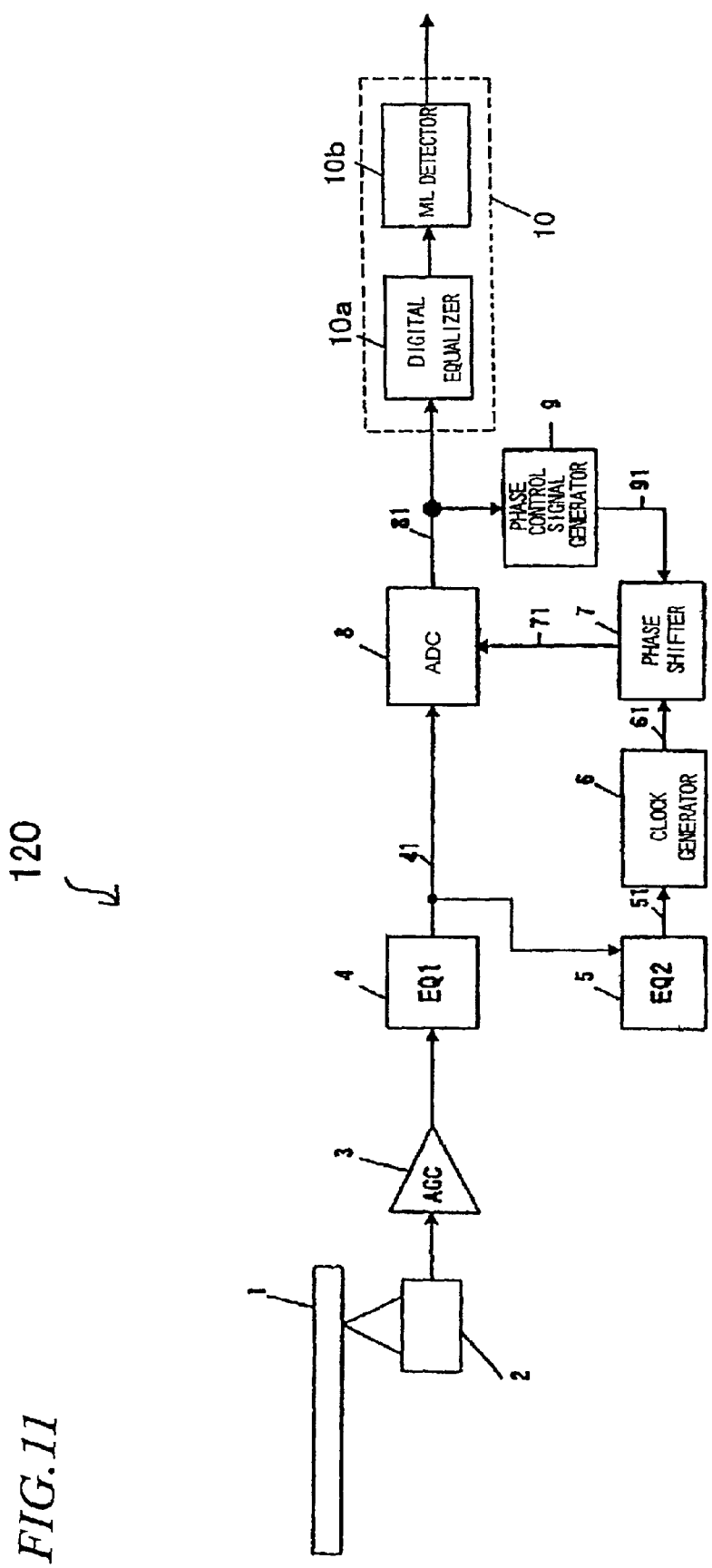
FIG. 11 is a block diagram illustrating a configuration for an optical disk drive according to yet another preferred embodiment of the present invention.

Furthermore, as in the information reproducing apparatus 120 shown in FIG. 11, a signal 41 that has been equalized only by the EQ1 4 may be input to the ADC 8, while a signal 51 that has been equalized by both of the EQ1 4 and EQ2 5 may be input to the clock generator 6. In this alternative configuration, the EQ2 5 is connected as a posterior-stage circuit to the EQ1 4. It should be noted that each of the other components of the apparatus 120 may have the same configuration as the counterpart of the apparatus 100 shown in FIG. 1.

The information reproducing apparatus of the present invention may have any of various other circuit configurations so long as the apparatus includes not only at least one waveform equalizer but also another waveform equalizer that is selectively used to extract a clock signal (i.e., the EQ2 5).

In the preferred embodiment described above, the PRML circuit 10 that utilizes a PRML signal processing technique is used as an exemplary decoder. Alternatively, a decoder utilizing any other signal processing technique may also be used. For example, an FDTS/DF (fixed-delay tree search with decision feedback) technique may be used as described by Osawa et al., in "Signal processing technology for high-density digital magnetic recording", Shingakuron C-II, Vol. J81-C-II, No. 4, pp. 393–412 (April 1998).

Furthermore, in the foregoing preferred embodiment, the present invention has been described as being applied to an optical disk drive. However, the present invention is broadly applicable to any of various other types of information reproducing apparatuses such as magnetic disk drives and magneto-optical disk drives.

As described above, according to the preferred embodiment of the present invention, a waveform equalizer for generating a clock signal is provided separately from a waveform equalizer for decoding data or a waveform equalizer for detecting a phase deviation. Thus, a read clock signal can be extracted just as intended and data can be decoded accurately enough responsive to this clock signal. In this manner, by defining multiple types of optimum equalization characteristics for respective purposes, data can be reproduced much more reliably.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An apparatus for reproducing information that has been digitally recorded on a storage medium, the apparatus comprising:

a first waveform equalizer which equalizes a read signal corresponding to the information read out from the storage medium, thereby outputting a first equalized signal; and a second waveform equalizer, which has an equalization characteristic different from an equalization characteristic of the first waveform equalizer, outputs a second equalized signal and is selectively used to extract a read clock signal for application to a phase locked loop, wherein the second waveform equalizer has an equalization characteristic which emphasizes high frequency components of the input signal more strongly than does the equalization characteristic of the first waveform equalizer.

2. The apparatus of claim 1, further comprising:

a clock generator for outputting the read clock signal responsive to the second equalized signal; and a decoder for generating digitized data from the first equalized signal.

3. The apparatus of claim 2, further comprising:

a phase shifter for shifting, responsive to a phase control signal, the phase of the read clock signal that has been output from the clock generator and outputting a phase shifted read clock signal as a sampling clock signal;

an analog to digital converter for converting the first equalized signal into a digital read signal by sampling the first equalized signal by reference to the sampling clock signal that has been output from the phase shifter; and a phase control signal generator for detecting a phase deviation of the sampling clock signal in accordance with the digital read signal that has been output from the A/D converter and outputting the phase control signal to the phase shifter so as to reduce the phase deviation of the sampling clock signal, wherein the decoder generates the digitized data from the digital read signal that has been output from the A/D converter.

4. The apparatus of claim 2, wherein the decoder performs its decoding operation in accordance with a pattern of a digital read signal that has been obtained by sampling the first equalized signal.

5. The apparatus of claim 4, wherein the decoder operates in accordance with a partial response maximum likelihood method.

6. The apparatus of claim 1, wherein the storage medium is an optical disk.

7. The apparatus of claim 1, wherein the first waveform equalizer has an equalization level which is smaller than an equalization level of the second waveform equalizer.

8. The apparatus of claim 1, further including a first equalization characteristic controller, wherein the first equalization characteristic controller receives a signal to be input to a maximum likelihood detector and a signal output from the maximum likelihood detector and performs feedback control over the equalization characteristic of the first waveform equalizer.

9. The apparatus of claim 1, further including a second equalization characteristic controller, wherein the second equalization characteristic controller receives the read clock signal and performs feedback control over the equalization characteristic of the second waveform equalizer.

* * * * *